(12) United States Patent
Okazaki et al.

(10) Patent No.: US 11,961,025 B2
(45) Date of Patent: Apr. 16, 2024

(54) AUTOMATED DRIVING VEHICLE, AND METHOD FOR CONTROLLING THE VEHICLE

(71) Applicants: TOYOTA JIDOSHA KABUSHIKI KAISHA, Toyota (JP); DENSO CORPORATION, Kariya (JP)

(72) Inventors: Kenji Okazaki, Toyota (JP); Hiroshi Higashide, Toyota (JP); Keiichi Uno, Kariya (JP)

(73) Assignees: TOYOTA JIDOSHA KABUSHIKI KAISHA, Toyota (JP); DENSO CORPORATION, Kariya (JP)

(*) Notice: Subject to any disclaimer, the term of this patent is extended or adjusted under 35 U.S.C. 154(b) by 511 days.

(21) Appl. No.: 17/215,012

(22) Filed: Mar. 29, 2021

(65) Prior Publication Data

US 2021/0312358 A1 Oct. 7, 2021

(30) Foreign Application Priority Data

Apr. 2, 2020 (JP) .................................. 2020-066599

(51) Int. Cl.
*G06Q 10/0631* (2023.01)
*B60W 60/00* (2020.01)

(52) U.S. Cl.
CPC ... *G06Q 10/06312* (2013.01); *B60W 60/0021* (2020.02); *G06Q 10/06313* (2013.01)

(58) Field of Classification Search
CPC ....... G06Q 10/06312; G06Q 10/06311; G06Q 10/063114; G06Q 10/063116; G06Q 10/06313; G06Q 50/30; B60W 40/04; B60W 40/06; B60W 50/0225; B60W 60/001; B60W 60/0011; B60W 60/0021; B60W 60/00253; B60W 60/007; B60W 2300/10; B60W 2556/45; B60W 2756/10; G01C 21/34; G01C 21/3407;
(Continued)

(56) References Cited

U.S. PATENT DOCUMENTS

| 2017/0001638 A1* | 1/2017 | Yoon ................. B60W 50/0097 |
| 2017/0108341 A1* | 4/2017 | Dewis ............ G06Q 10/063116 |

(Continued)

FOREIGN PATENT DOCUMENTS

| JP | 2000-264210 A | 9/2000 |
| JP | 2002-53044 A | 2/2002 |
| JP | 2020-34376 A | 3/2020 |

*Primary Examiner* — Russell Frejd
*Assistant Examiner* — Brandon Z Willis
(74) *Attorney, Agent, or Firm* — Oliff PLC (57) ABSTRACT

An automated driving vehicle includes: a communication device which receives a traveling plan from an operation management device provided outside an vehicle; and an automated driving controller which allows an vehicle the controller is associated with to travel autonomously along a traveling route on which a plurality of stations are set so as to fulfill the traveling plan, in which the automated driving controller has a standard plan which prescribes a standard operation schedule of the vehicle the controller is associated with, and the automated driving controller, in a case where the traveling plan has not arrived or is irregular, generates an interim plan on the basis of the standard plan, and allows the vehicle the controller is associated with to travel autonomously so as to fulfill the interim plan.

8 Claims, 8 Drawing Sheets

(58) Field of Classification Search
CPC .............. G01C 21/3415; G01C 21/343; G01C 21/3446; G01C 21/3492; G01C 21/3691; G01C 21/3655
See application file for complete search history.

(56) References Cited

U.S. PATENT DOCUMENTS

| | | | |
|---|---|---|---|
| 2017/0314939 A1* | 11/2017 | Carter | G01C 21/3492 |
| 2018/0059688 A1* | 3/2018 | Benraz | G05D 1/0088 |
| 2019/0265054 A1* | 8/2019 | Laplante | G01C 21/362 |
| 2019/0265703 A1* | 8/2019 | Hicok | G05D 1/0088 |

* cited by examiner

AUTOMATED DRIVING VEHICLE, AND METHOD FOR CONTROLLING THE VEHICLE

CROSS REFERENCE TO RELATED APPLICATION

This application claims priority to Japanese Patent Application No. 2020-066599 filed on Apr. 2, 2020, which is incorporated herein by reference in its entirety, including the specification, claims, drawings, and abstract.

TECHNICAL FIELD

This Specification discloses an automated driving vehicle that travel autonomously according to a traveling plan transmitted from an operation management device, and a method for controlling the vehicle.

BACKGROUND ART

In recent years, traffic systems using vehicles capable of traveling autonomously have been provided. For example, Patent Document 1 discloses a vehicle traffic system using vehicles capable of traveling autonomously along an exclusive route. The vehicle traffic system is equipped with a plurality of vehicles which travel along an exclusive route, and a management and control system which allows the plurality of vehicles to operate. The management and control system transmits a leaving command or a course command to the vehicles according to an operation plan.

CITATION LIST

PATENT LITERATURE 1: JP2000-264210 A

In such a traffic system, there is a case where a vehicle cannot receive an operation plan, or some kind of irregularity occurs in the contents of the operation plan due to some kind of problem. In such a case, a smooth operation of vehicles is hindered if appropriate measures cannot be taken on the vehicle side. However, Patent Document 1 does not examine any measures for the case where the vehicle cannot receive an appropriate operation plan.

Therefore, this specification discloses an automated driving vehicle that can realize a smooth operation of the automated driving vehicle more securely, and a method for controlling the vehicle.

SUMMARY

An automated driving vehicle disclosed in this specification includes: a communication device which receives a traveling plan from an operation management device provided outside the vehicle; an automated driving controller which allows the vehicle to travel autonomously along a traveling route on which a plurality of stations is set so as to fulfill the traveling plan, in which the automated driving controller has a standard plan which prescribes a standard operation schedule of the vehicle, the automated driving controller, in the case where the traveling plan has not arrived by necessary timing or the traveling plan is irregular, generates an interim plan on the basis of the standard plan, and allows the vehicle to travel autonomously so as to fulfill the interim plan.

With such a configuration, automated driving vehicles can be operated smoothly even in the case where the traveling plan has not arrived or is irregular.

In this case, the standard plan may prescribe departure or arrival times for each of a plurality of stations by time interval or elapsed time.

By prescribing departure/arrival times not by clock time but by time interval or elapsed time, clock time dependency of a standard plan 84 is eliminated, and a single standard plan can be used regardless of clock time.

Further, when the traveling plan has not arrived or is irregular and in the case where the vehicle is delayed with respect to the traveling plan or the interim plan which have been recently acquired and are normal, the automated driving controller may generate a plan to accelerate the vehicle, as the interim plan, so as to eliminate the delay.

With such a configuration, delay of the vehicle can be eliminated even in the case where the traveling plan has not arrived or is irregular, and eventually an interval with other automobiles can be appropriately maintained.

Further, the automated driving controller has a plurality of types of the standard plans, and may generate an interim plan on the basis of the standard plan alternatively selected from the plurality of types of standard plans in the case where the traveling plan has not arrived or is irregular. In this case, the automated driving controller may select a single standard plan from the plurality of types of standard plans on the basis of at least one of the date and time, a road surface state of the traveling route, and a traffic conditions of the traveling route.

With such a configuration, a more appropriate interim plan can be generated, and automated driving vehicles can be operated more smoothly.

Further, the automated driving controller may determine the traveling plan as irregular in the case where prescribed speed prescribed by the traveling plan is out of a prescribed reference speed range.

With such a configuration, irregularity of the traveling plan can be determined simply.

Further, in the case where the automated driving controller receives a command to restart an operation from the operation management device after receiving a command to discontinue an operation, it generates the interim plan on the basis of the standard plan, and may execute restoration traveling to allow the vehicle to travel autonomously for a certain section so as to fulfill the interim plan.

With such a configuration, an automated driving vehicle can be operated smoothly even in the case where a traveling plan cannot be received at the point where the command to restart an operation is received.

A control method of an automated driving vehicle disclosed in this specification is a control method of an automated driving vehicle in which a traveling plan is received from an operation management device provided outside the vehicle, and the vehicle is allowed to travel autonomously so as to fulfill the traveling plan along a traveling route on which a plurality of stations are set, and in the case where the traveling plan has not arrived by necessary timing or the traveling plan is irregular, an interim plan is generated on the basis of a standard plan which prescribes a standard operation schedule of the vehicle, and the vehicle is allowed to travel autonomously so as to fulfill the interim plan.

According to the technique disclosed in this specification, a smooth operation of automated driving vehicles can be realized more securely.

BRIEF DESCRIPTION OF DRAWINGS

Embodiment(s) of the present disclosure will be described based on the following figures, wherein.

DESCRIPTION OF EMBODIMENTS

Figure 1:
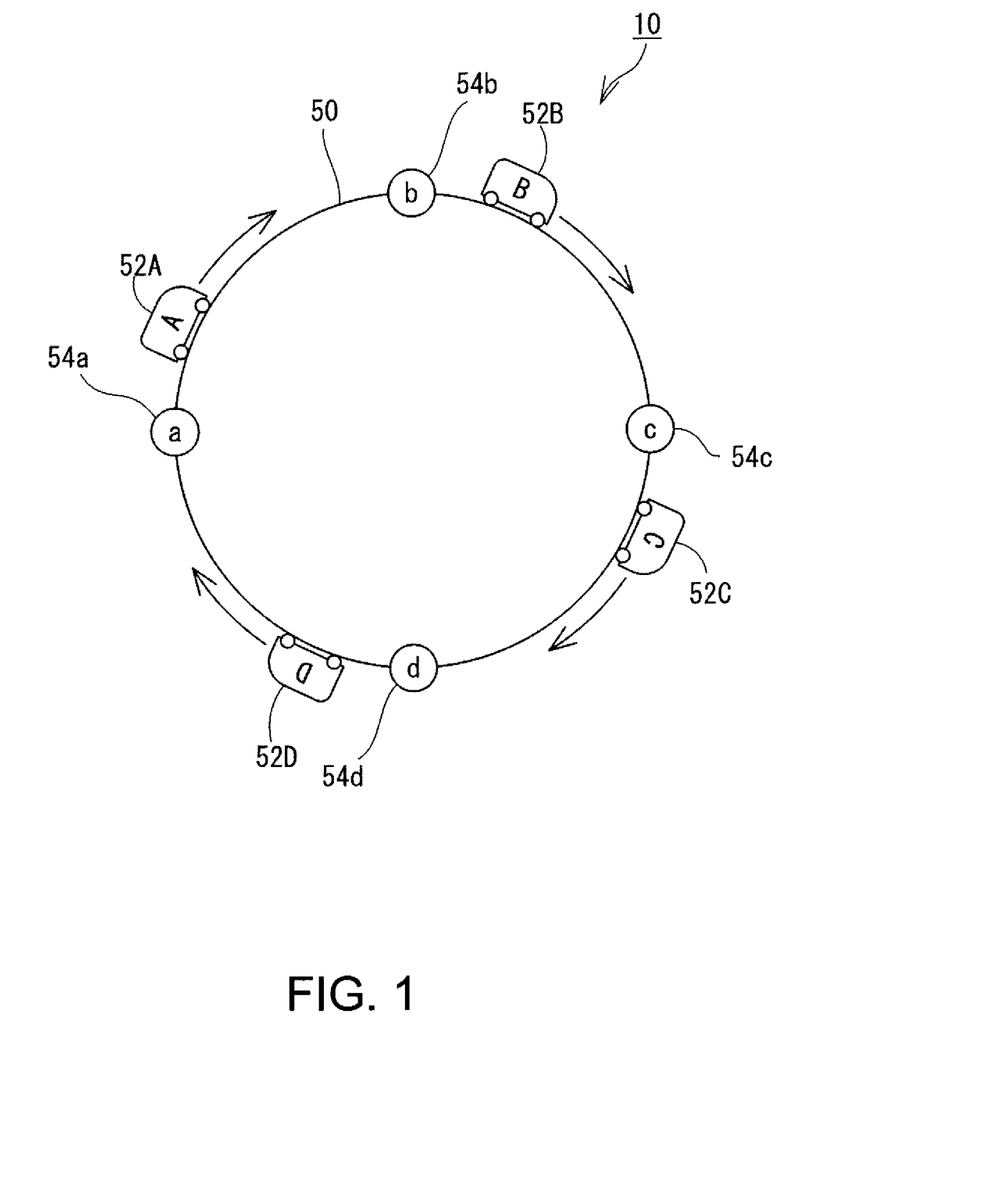
FIG. 1 is an image diagram of a traffic system.
Figure 2:
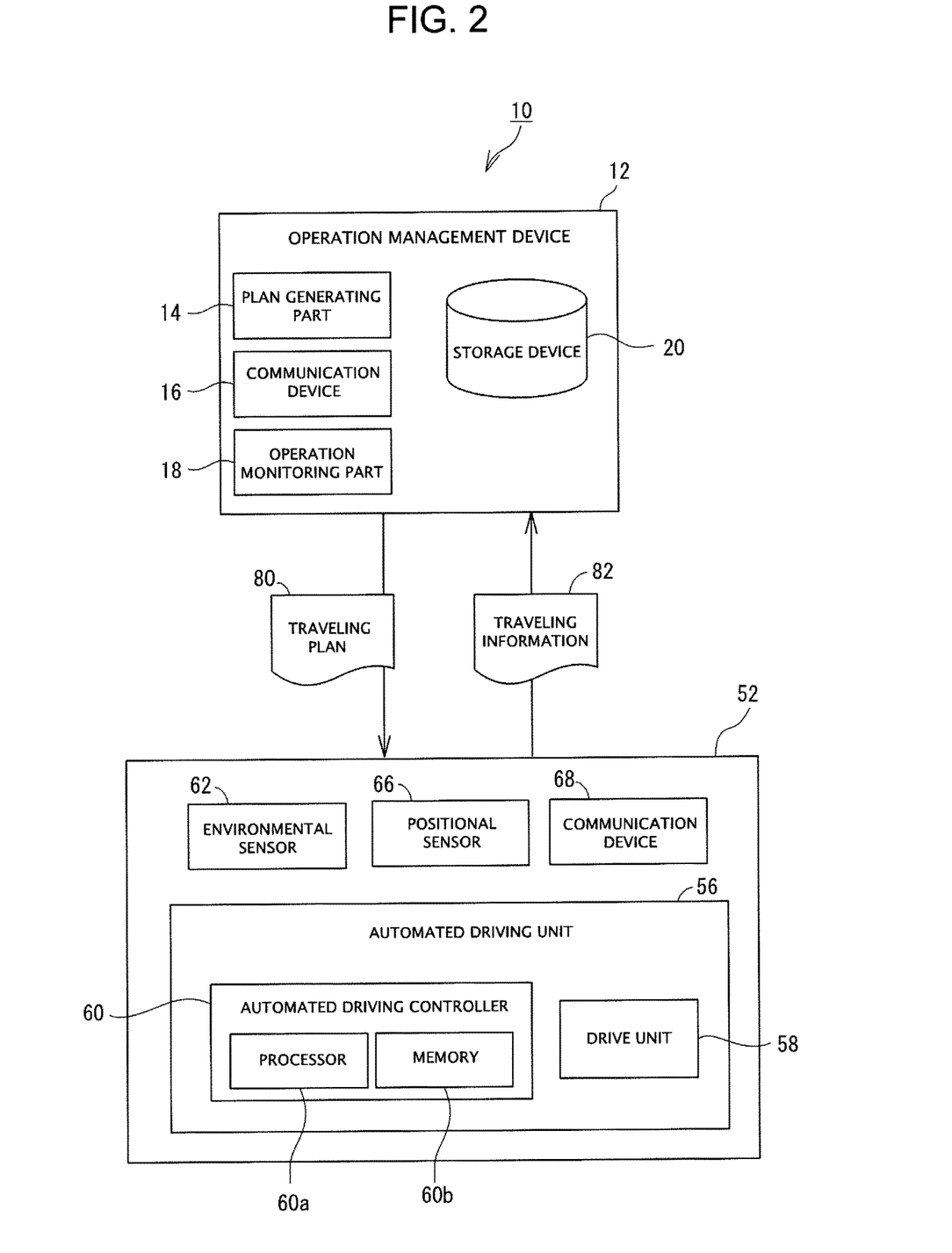
FIG. 2 is a block diagram of the traffic system.
Figure 3:
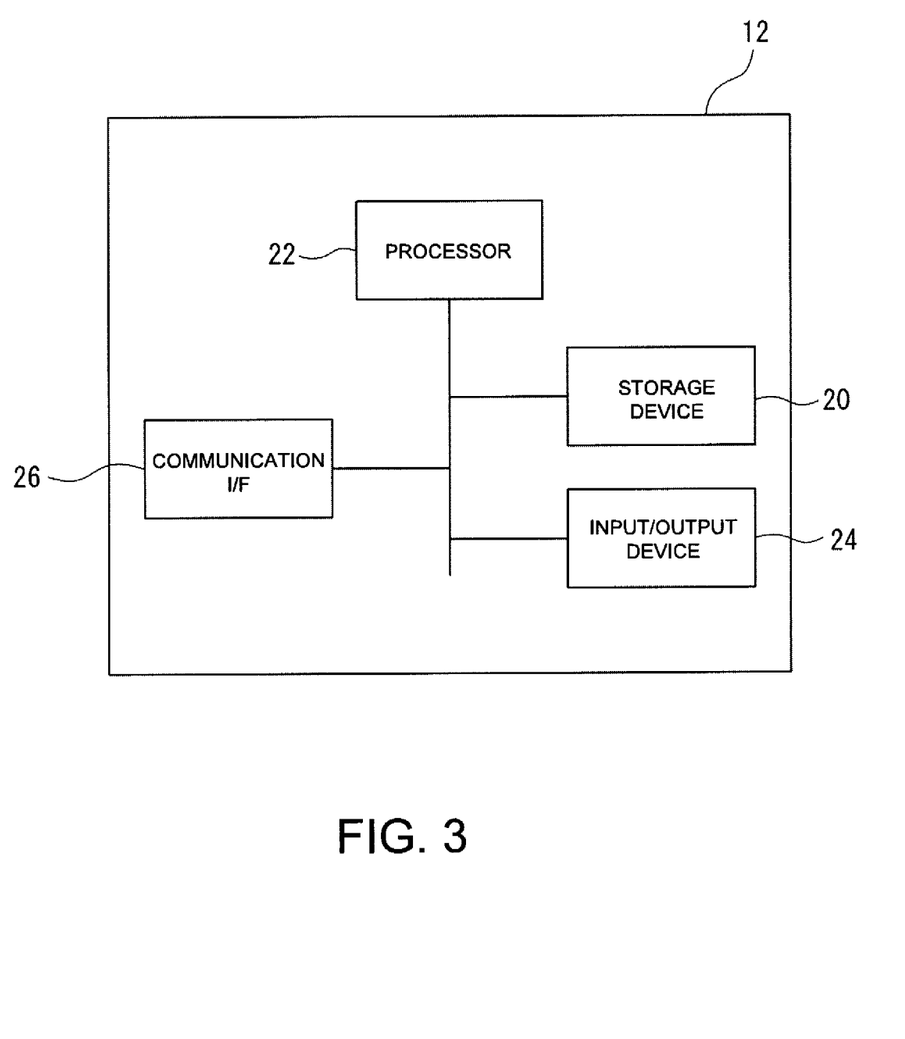
FIG. 3 is a block diagram showing a physical configuration of an operation management device.

Hereinafter, referring to the drawings, a constitution of a traffic system 10 having a plurality of automated driving vehicles (hereinafter, abbreviated as "vehicle(s)") will be explained. FIG. 1 is a diagram of the traffic system 10, and FIG. 2 is a block diagram of the traffic system 10. Furthermore, FIG. 3 is a block diagram showing a physical configuration of an operation management device 12.

The traffic system 10 is a system for transporting many and unspecified users along a previously prescribed traveling route 50. The traffic system 10 has a plurality of stations 54a to 54d set on the traveling route 50 and a plurality of vehicles 52A to 52D capable of travel autonomously along the traveling route 50. Hereinafter, in the case where the plurality of automated driving vehicles 52A to 52D are not discriminated, index letters are omitted, and they are shown as "vehicle(s) 52". Similarly, when there is no need to discriminate the plurality of stations 54a to 54d, they are shown as "station(s) 54".

The plurality of vehicles 52 make circulating travel in one direction along the traveling route 50, and constitute a single line of cars. The vehicles 52 temporarily stop at each station 54. Users get on the vehicles 52 or get off the vehicle 52 when the vehicle stops at which the vehicle 52 temporarily stops. Therefore in this example, each vehicle 52 functions as a commuter bus that transports many and unspecified users from one station 54 to another station 54. The operation management device 12 (not shown in FIG. 1, refer to FIG. 2, FIG. 3) manages operations of the plurality of vehicles 52. In this example, the operation management device 12 controls the operations of the plurality of vehicles 52 such that the vehicles have an equal interval operation. The equal interval operation is an operation mode in which departure intervals of the vehicles 52 become equal at each station 54. Therefore, the equal interval operation is an operation mode in which when a departure interval at the station 54a is 5 minutes, a departure interval at other stations 54b, 54c, 54d also becomes 5 minutes, for example.

Each element constituting such a traffic system 10 will be explained more specifically. The vehicle 52 travels autonomously according to a traveling plan 80 provided from the operation management device 12. The traveling plan 80 defines a traveling schedule of the vehicle 52. In this example, the traveling plan 80 prescribes departure timing of the vehicle 52 at each of the stations 54a to 54d, as will be described in detail. The vehicle 52 travels autonomously so as to be able to depart from each station 54 at the time defined by the traveling plan 80. In other words, determination of station-to-station traveling speed, stopping at a signal or the like, necessity of passing other vehicles, and the like are all performed at the vehicle 52 side.

As shown in FIG. 2, the vehicle 52 has an automated driving unit 56. The automated driving unit 56 is broadly divided into a drive unit 58 and an automated driving controller 60. The drive unit 58 is a fundamental unit for allowing the vehicle 52 to travel, and includes a prime mover, a power-transmitting device, a brake device, a traveling device, a suspension device, a steering device and the like, for example.

The automated driving controller 60 controls the drive of the drive unit 58, and allows the vehicle 52 to travel autonomously. The automated driving controller 60 is a computer having a processor 60a and a memory 60b, for example. The "computer" also includes a microcontroller in which a computer system is assembled into a single integrated circuit. Further, the processor denotes a broadly defined processor, which includes a general-purpose processor (CPU: Central Processing Unit or the like for example) and a dedicated processor (GPU: Graphics Processing Unit, ASIC: Application Specific Integrated Circuit, FPGA: Field Programmable Gate Array, programmable logical device or the like, for example). Further, although FIG. 2 describes the automated driving controller 60 as a single element, the automated driving controller 60 may have a plurality of the processors 60a and a plurality of the memories 60b which cooperate with each other.

A standard plan 84 in which a standard operation schedule of the vehicle is prescribed is stored in the memory 60b of the automated driving controller 60. In the case where an appropriate traveling plan 80 cannot be received from the operation management device 12 at the appropriate timing, the automated driving controller 60 generates an interim plan 86 by referring to the standard plan 84, which will be described later.

In order to make autonomous traveling possible, an environmental sensor 62 and a positional sensor 66 are further mounted on the vehicle 52. The environmental sensor 62 detects the ambient environment of the vehicle 52, and includes a camera, a Lidar, a millimeter-wave radar, a sonar, a magnetic sensor or the like for example. The automated driving controller 60 recognizes types of surrounding objects of the vehicle 52, a distance from the object, roadbed signs (e.g., white lines etc.) on the traveling route 50, and traffic signs or the like on the basis of a detection result by the environmental sensor 62. Further, the positional sensor 66 detects a current position of the vehicle 52, and is a GPS for example. A detection result by the positional sensor 66 is also sent to the automated driving controller 60. The automated driving controller 60 controls acceleration/deceleration and steering of the vehicle 52 on the basis of detection results from the environmental sensor 62 and the positional sensor 66. Such a control state by the automated driving controller 60 is transmitted to the operation management device 12 as traveling information 82. The traveling information 82 includes at least the current position of the vehicle 52.

A communication device 68 is further provided for the vehicle 52. The communication device 68 is a device that wirelessly communicates with the operation management device 12. The communication device 68 can communicate on the Internet via a wireless LAN such as WiFi (registered trademark) or a mobile data communication service provided by a mobile phone company or the like, for example. The communication device 68 receives the traveling plan 80 from the operation management device 12, and transmits the traveling information 82 to the operation management device 12.

The operation management device 12 monitors an operation status of the vehicle 52, and controls the operation of the vehicle 52 according to the state of the operation. The operation management device 12 is physically a computer having a processor 22, a storage device 20, an input/output device 24, and a communication I/F 26 as shown in FIG. 3. The processor denotes a broadly defined processor, and includes a general-purpose processor (e.g., CPU) and an exclusive processor (e.g., GPU, ASIC, FPGA, programmable logical device, etc.). Further, the storage device 20 may include at least one of a semiconductor memory (e.g., RAM, ROM, solid-state drive, etc.) and a magnetic disc (e.g., hard disc drive, etc.). It should be noted that FIG. 3 shows the operation management device 12 as a single computer, but the operation management device 12 may be constituted by a plurality of physically separated computers.

The operation management device 12 functionally has a plan generating part 14, a communication device 16, an operation monitoring part 18, and the storage device 20 as shown in FIG. 2. The plan generating part 14 generates the traveling plan 80 for each of the plurality of vehicles 52. The traveling plan 80 is generated such that an operation interval between the plurality of vehicles 52 becomes a previously defined target operation interval.

The communication device 16 is a device for wirelessly communicating with the vehicle 52, and is capable of performing Internet communication by using WiFi or mobile data communication, for example. The communication device 16 transmits the traveling plan 80 generated by the plan generating part 14 to the vehicle 52, and receives the traveling information 82 from the vehicle 52.

The operation monitoring part 18 acquires an operation status of the vehicle 52 on the basis of the traveling information 82 transmitted from each vehicle 52. The traveling information 82 includes the current position of the vehicle 52 as described above. The operation monitoring part 18 collates the position of each vehicle 52 and the traveling plan 80, and calculates a delay amount of the vehicle 52 for the traveling plan 80, an operation interval of each vehicle 52, or the like.

Figure 4:
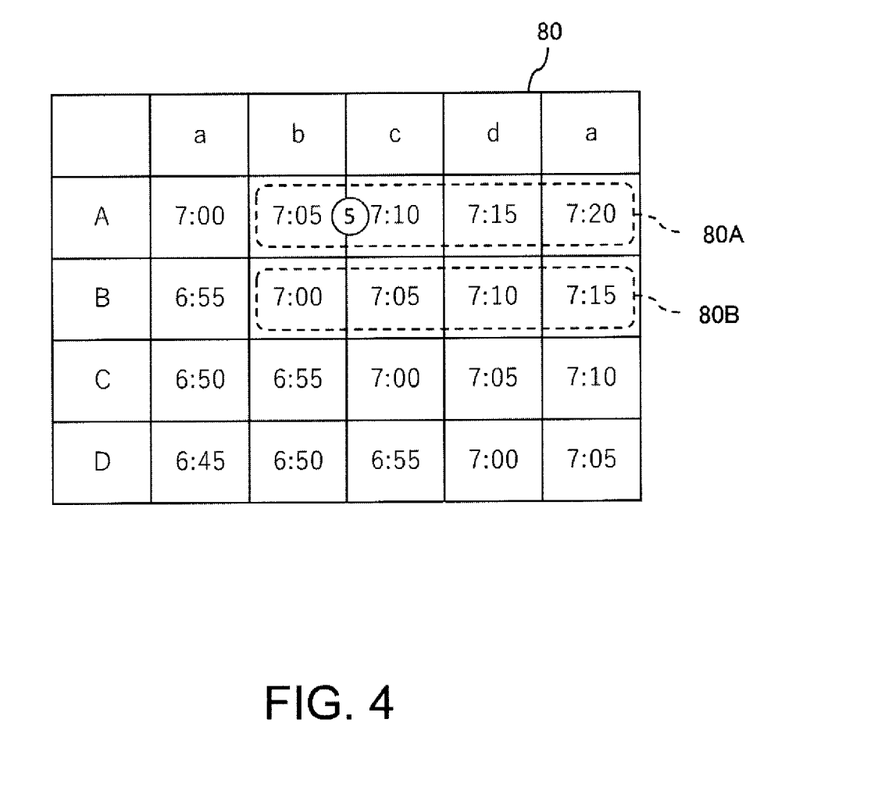
FIG. 4 is a view showing an example of a traveling plan used in the traffic system of FIG. 1.

Next, operation management in the traffic system 10 will be explained in detail. FIG. 4 is a view showing an example of the traveling plan 80 used in the traffic system 10 of FIG. 1. In the example of FIG. 1, a line of vehicles is constituted of four vehicles 52A to 52D, and four stations 54a to 54d are disposed at an equal intervals on the traveling route 50. Further, in this example, time required for each vehicle 52 to circulate the traveling route 50, that is, circulating time TC, is assumed to be 20 minutes.

In this case, the operation management device 12 generates the traveling plan 80 such that a departure interval of the vehicle 52 at each station 54 becomes a time obtained by dividing the circulating time TC by the number N of the vehicles 52, which is 20/4=5 minutes. Departure time at each station is recorded in the traveling plan 80. For example, target clock time at which the vehicle 52A departs from each of the stations 54a to 54d is recorded in the traveling plan 80A transmitted to the vehicle 52A.

Further, a time schedule for only one circulation is normally recorded in the traveling plan 80, and the schedule is transmitted from the operation management device 12 to the vehicle 52 at the time when each vehicle 52 arrives at a specific station which is the station 54a, for example. For example, the vehicle 52A receives the traveling plan 80A for one circulation from the operation management device 12 at the time when it arrives at station 54 (for example, 7:59), and the vehicle 52B receives the traveling plan 80B for one circulation from the operation management device 12 at the time when it arrives at the station 54 (e.g., 6:54).

Figure 5:
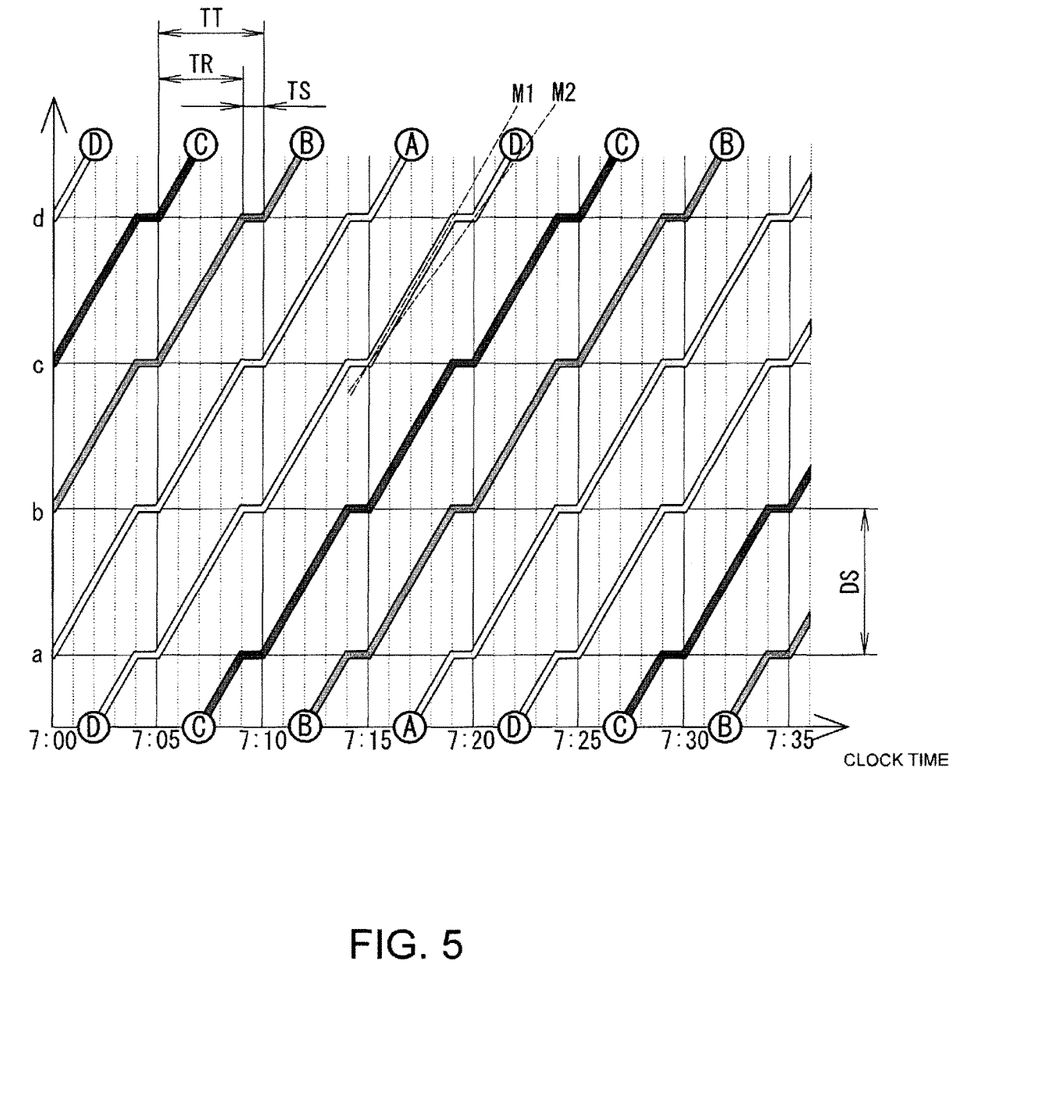
FIG. 5 is an operation timing chart of each vehicle that travels autonomously according to the traveling plan of FIG. 4.

Each vehicle 52 travels autonomously according to the received traveling plan 80. FIG. 5 is an operation timing chart of each vehicle 52A to 52D which travels autonomously according to the traveling plan 80 of FIG. 4. In FIG. 5, with axis of abscissa showing the clock time, and an axis of ordinates showing the position of the vehicle 52, respectively. Before explaining how each vehicle 52 travels, meanings of various parameters used in the following explanation will be briefly explained.

In the following explanation, a distance from one station 54 to the next station 54 is referred to as "station-to-station distance DS". Further, time from a point when the vehicle 52 departs from one station 54 until it departs from the next station 54 is referred to as "station-to-station duration TT", and stopping time of the vehicle 52 at the station 54 for users to get on and off is referred to as "stopping time TS". Furthermore, time from a point when the vehicle departs from one station 54 until it arrives at the next station 54, that is, time obtained by subtracting the stopping time TS from the station-to-station duration TT is referred to as "station-to-station traveling time TR". In FIG. 4, circled figures show the station-to-station duration TT.

Furthermore, a value obtained by dividing a transfer distance by transfer time including the stopping time TS is referred to as "scheduled speed VS", and a value obtained by dividing a transfer distance by transfer time not including the stopping time TS is referred to as "average traveling speed VA". Inclination of a line M1 in FIG. 5 denotes the average traveling speed VA, and inclination of a line M2 in FIG. 5 denotes a scheduled speed VS. The scheduled speed VS is inversely proportional to the station-to-station duration TT.

Next, referring to FIG. 5, an operation of the vehicle 52 will be explained. According to the traveling plan 80 in FIG. 4, the vehicle 52A, after departing from the station 54a at 7:00, must depart the station 54b 5 minutes later which is 7:05. The vehicle 52A controls its average traveling speed VA so as to complete transfer from the station 54a to the station 54b, and users getting on and off, during the 5 minutes.

Specifically, the vehicle 52 previously stores standard stopping time TS necessary for user to get on and off as planned stopping time TSp. Then, the vehicle 52 calculates a clock time obtained by subtracting the planned stopping time TSp from the departure clock time of the station 54 defined by the traveling plan 80 as an arrival target clock time at the station 54. For example, in the case where the planned stopping time TSp is 1 minute, the arrival target clock time of the vehicle 52A at the station 54b is 7:04. The vehicle 52 controls its traveling speed so as to be able to arrive at the next station 54 by the calculated arrival target clock time.

Incidentally, there is a case where each vehicle 52 cannot receive the appropriate traveling plan 80 at the appropriate time due to a communication problem, or a problem in the operation management device 12, or the like. For example, as described above, the traveling plan 80 is transmitted from the operation management device 12 to the vehicle 52 at the time when the vehicle 52 arrives at the specific station 54a, but there is a case where the vehicle 52 cannot receive the traveling plan 80 at the time when it arrives at the station 54a due to a communication problem. Further, even if the vehicle could receive the traveling plan 80, in the case where the scheduled speed VS prescribed by the traveling plan 80 is excessively high or excessively low, the traveling plan 80 can be determined as irregular.

As described, stable traveling of the vehicle 52 is hindered in the case where the traveling plan 80 has not arrived or is irregular. Then, in this example, the automated driving controller 60 of each vehicle 52 has a standard plan 84 in which a standard operation schedule of the vehicle is prescribed, and the controller generates an interim plan 86 on the basis of the standard plan 84 in the case where the traveling plan 80 has not arrived or is irregular, and allows the vehicle to travel according to the interim plan 86. This will be explained in detail as follows.

Figure 6:
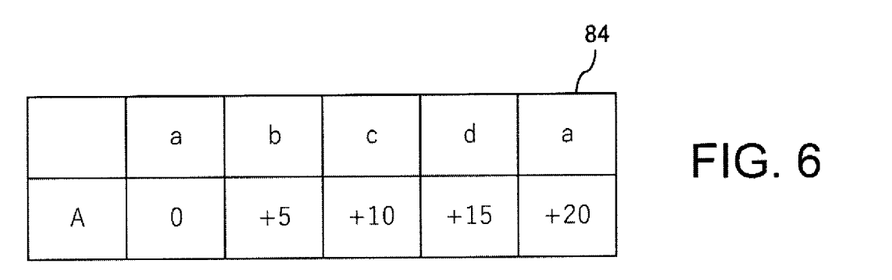
FIG. 6 is a view showing an example of a standard plan.

FIG. 6 is a view showing an example of the standard plan 84 stored in a memory of the automated driving controller 60. The standard plan 84 defines a standard operation schedule of the vehicle. The standard plan 84 of this example, as shown in FIG. 6, prescribes elapsed times from the point of departing from the specific station 54a until departing from each station 54. The standard plan 84 of FIG. 6 prescribes that the vehicle 52 departs from the station 54b 5 minutes after departing from the station 54a, and departs from the station 54c 10 minutes after departing from the station 54a.

Figure 7:
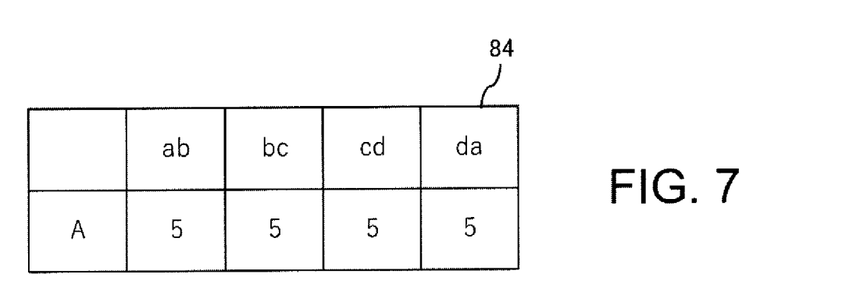
FIG. 7 is a view showing another example of a standard plan.

Further, as another mode, the standard plan 84 may prescribe a time interval between each station as shown in FIG. 7 instead of elapsed time using the specific station 54a as a reference. The standard plan 84 of FIG. 7 prescribes that the vehicle 52 departs from the station 54b 5 minutes after departing from the station 54a, and departs from the station 54c 5 minutes after departing from the station 54b. In any case, in the case where arrival or departure time for each station 54 is prescribed not by clock time but by elapsed time or a time interval, a single standard plan 84 can be used at any clock time because time dependency is eliminated from the standard plan 84.

However, a constitution of the standard plan 84 is not particularly limited as long as the plan can be grasped. Therefore, the standard plan 84 may be an operation diagram style prescribing the arrival or departure clock time of each station 54.

Figure 8:
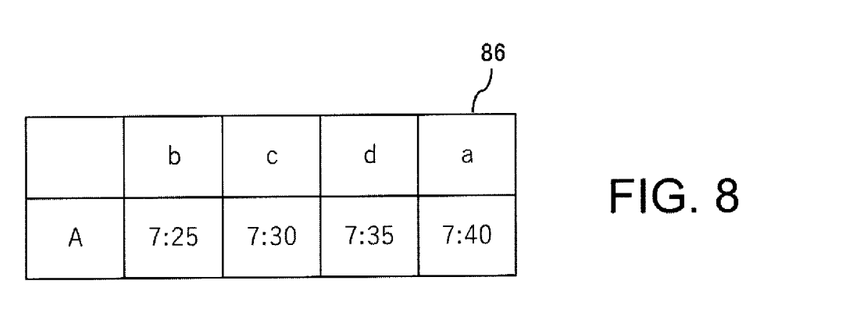
FIG. 8 is a view showing an example of an interim plan.

According to the traveling plan 80 of FIG. 4, the vehicle 52A departs from the station 54a at 7:20, but in the case where the appropriate traveling plan 80 cannot be received by the time immediately before the departure, the automated driving controller 60 generates the interim plan 86 on the basis of the standard plan 84. FIG. 8 is a view showing an example of the interim plan 86 generated on the basis of the standard plan 84 of FIG. 6. According to the interim plan 86, the vehicle 52A leaves the station 54b 5 minutes after departing from the station 54a, and leaves the station 54c 10 minutes after departing from the station 54a. Therefore in this case, the automated driving controller 60 generates the interim plan 86 such that the vehicle 52A departs from the station 54b at 7:25 and departs from the station 54c at 7:30. Then, the automated driving controller 60 controls traveling of the vehicle according to the interim plan 86.

As described above, in the case where the traveling plan 80 has not arrived or is irregular, by generating the interim plan 86 on the basis of the previously stored standard plan 84, the vehicle 52 can be allowed to travel stably even in the case where a communication problem or a problem with the operation management device 12 has occurred.

Incidentally, there is a case where the vehicle 52 is delayed from the traveling plan 80 or the interim plan 86 due to a traffic conditions on the traveling route 50, elongation of the getting on and off time TE at the station 54, or the like. In the case where the operation management device 12 is normal and can appropriately communicate with the vehicle 52, the operation management device 12 corrects the traveling plan 80 so as to be able to eliminate a problem due to the delay, and transmits a plan after correction to each vehicle 52. However, in the case where a communication problem or a problem occurs in the operation management device 12, the vehicle 52 cannot appropriately receive the corrected traveling plan 80.

Then, in the case where delay of the vehicle 52 for the most recent traveling plan 80 or interim plan 86 occurs at the time when the traveling plan 80 has not arrived or is irregular, the automated driving controller 60 generates the interim plan 86 that can eliminate the delay, which will be specifically explained.

According to the traveling plan 80 of FIG. 4, the vehicle 52A departs from the station 54a at 7:20. However, it is assumed that the vehicle 52A departed from the station 54a at 7:22 which is delayed by 2 minutes because of some kind of problem, and could not receive the appropriate traveling plan 80 by the time immediately before the departure. In this case, the automated driving controller 60 generates the interim plan 86 by using the most recently acquired traveling plan 80, that is, the traveling plan 80 of FIG. 4, as a reference.

In other words, although the vehicle 52A actually departed from the station 54a at 7:22, the controller generates the interim plan 86 assuming that the vehicle 52A departed from the station 54a at 7:20 as in the traveling plan 80 of FIG. 4. In this case, the interim plan 86 is as shown in FIG. 8. The automated driving controller 60 allows the vehicle 52 to travel according to the interim plan 86 of FIG. 8, and at the point where the vehicle departs from the station 54a, the vehicle 52 is delayed for the interim plan 86. Therefore, in order to eliminate the delay, the automated driving controller 60 temporarily increases the average traveling speed VA of the vehicle or temporarily shortens the stopping time TS at the station 54, and temporarily increases the scheduled speed VS of the vehicle.

Figure 9:
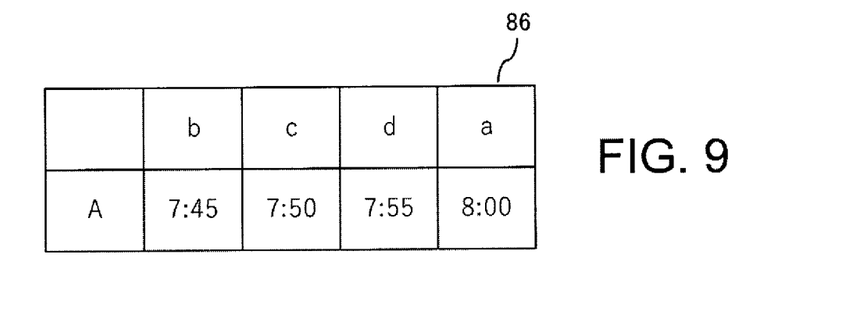
FIG. 9 is a view showing an example of an interim plan generated after a vehicle has traveled according to the interim plan of FIG. 8.

It is assumed that the vehicle 52A departed from the station 54a at 7:41 which is delayed for the interim plan 86 by 1 minute as a result of traveling according to the interim plan 86 of FIG. 8, and could not receive the appropriate traveling plan 80 by the time immediately before the departure. In this case, the automated driving controller 60 generates a new interim plan 86 assuming that the vehicle 52A departed from the station 54a at 7:40 as in the most recent interim plan 86, that is, the interim plan 86 of FIG. 8. In this case, the new interim plan 86 is as shown in FIG. 9.

As described, in the case where the vehicle 52 is delayed for the most recent traveling plan 80 or interim plan 86 when the traveling plan 80 has not arrived or is irregular, the scheduled speed VS of the vehicle 52 can be temporarily increased so as to eliminate the delay by generating the interim plan 86 by using the most recent traveling plan 80 or interim plan 86 as a reference.

Figure 10:
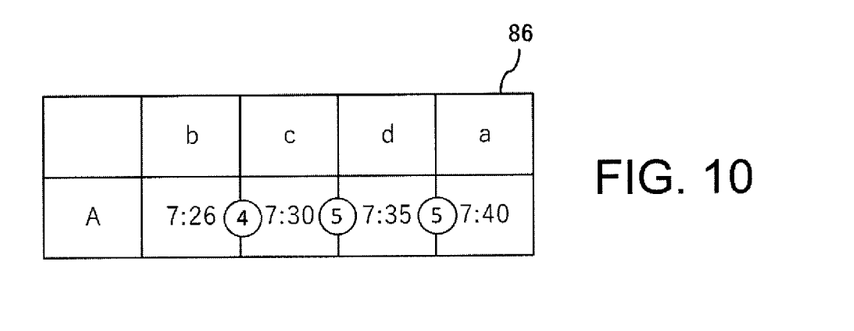
FIG. 10 is a view showing another example of an interim plan.

It should be noted that the interim plan 86 is generated by using the most recent traveling plan 80 or interim plan 86 as a reference in the above-described example. If the scheduled speed VS of the vehicle 52 can be temporarily increased in order to eliminate the delay, the interim plan 86 may be in other modes. For example, instead of the interim plan 86 of FIG. 8, an interim plan 86 in which the scheduled speed VS is temporarily increased even in the interim plan 86 can be used as shown in FIG. 10. The interim plan 86 of FIG. 10 prescribes that the vehicle 52A, after departing from the station 54a at 7:22, departs from the station 54b at 7:26, which is 4 minutes later, and departs from the station 54c at 7:30, which is further 4 minutes later. The delay can be eliminated by such an interim plan 86.

Figure 11:
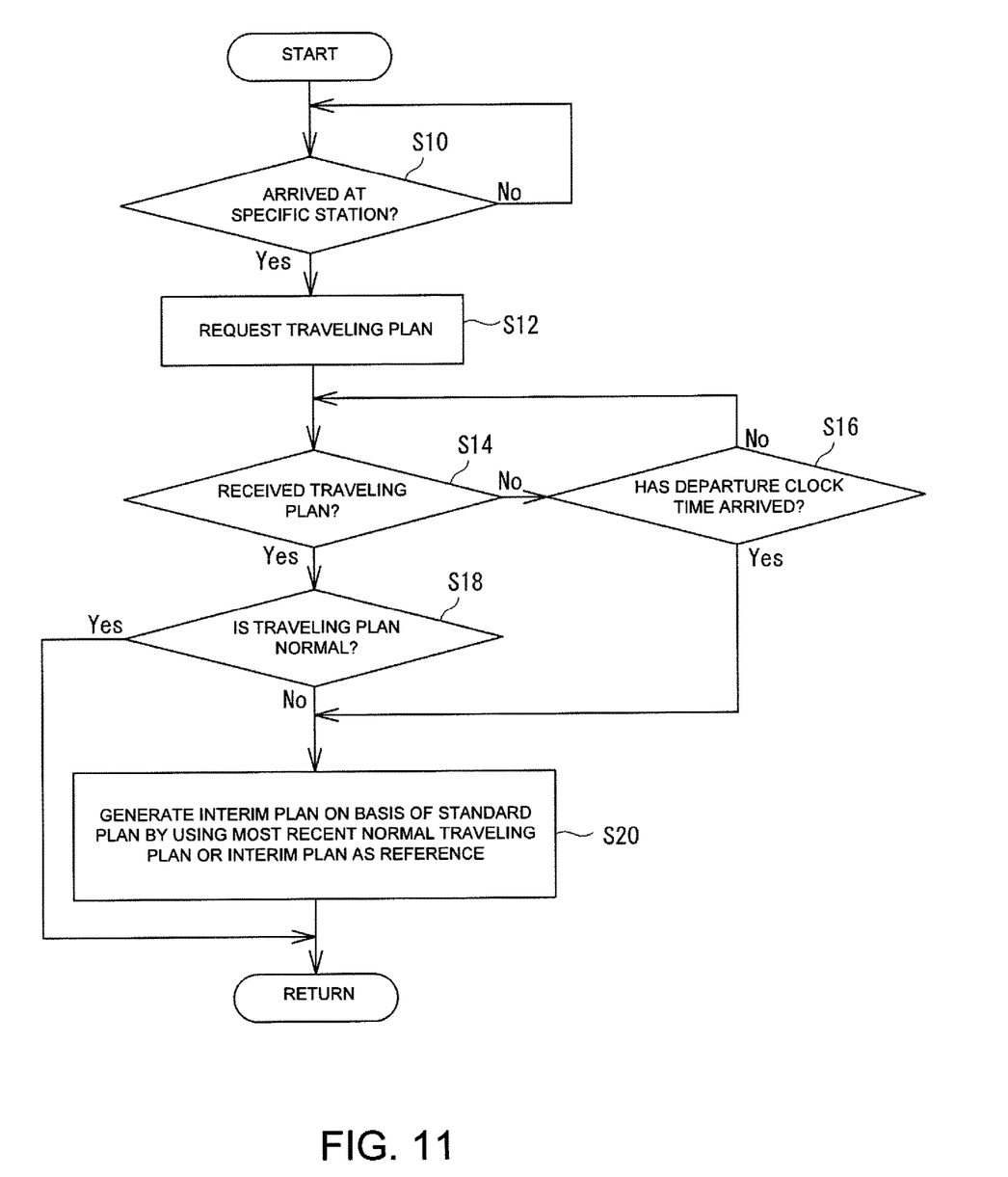
FIG. 11 is a flowchart showing a flow of generation of an interim plan.

FIG. 11 is a flowchart showing a flow of generating the interim plan 86. The automated driving controller 60 transmits a request for the traveling plan 80 to the operation management device 12 (S12) in the case where the vehicle arrived at the specific station 54a (Yes in S10). After transmitting the request, the automated driving controller 60 confirms whether or not it could receive the traveling plan 80 from the operation management device 12 (S14). In the case where the controller cannot receive the traveling plan 80 by the departure clock time (Yes in S16), the automated driving controller 60 proceeds to Step S20, and generates the interim plan 86.

On the other hand, in the case where the controller could receive traveling plan 80 by the departure clock time (Yes in S14), the automated driving controller 60 confirms whether or not the received traveling plan 80 is normal (S18). For example, the automated driving controller 60, in the case where the scheduled speed VS obtained in the traveling plan 80 is off from a previously defined reference speed range, that is, in the case where the scheduled speed VS is excessively high or excessively low, determines that the traveling plan 80 is irregular. Further, the automated driving controller 60 determines the traveling plan 80 to be irregular even in the case where the traveling plan 80 is off from a previously prescribed style or the like.

In the case where the traveling plan 80 is normal as a result of confirmation (Yes in S18), the automated driving controller 60 ends the processing without generating the interim plan 86. On the other hand, in the case where the traveling plan 80 is irregular (No in S18), the automated driving controller 60 proceeds to Step S20, and generates the interim plan 86.

In step S20, the automated driving controller 60 generates the interim plan 86 on the basis of the standard plan 84 by using departure clock time prescribed by the most recent normal traveling plan 80 or interim plan 86 as a reference.

As is clear from the foregoing explanation, according to this example, because the interim plan 86 is generated on the vehicle 52 side even in the case where the traveling plan 80 has not arrived or is irregular, the vehicle 52 can be allowed to travel stably. However, the automated driving controller 60 grasps only the traveling status of the vehicle, and does not grasp the traveling status of other vehicles. Some problem could occur in the case of traveling on the basis of interim traveling for a long period of time in such a state. Then, in the case where the normal traveling plan 80 cannot be received beyond a prescribed allowable time, the controller may stop generation of the interim plan 86 and stop the vehicle 52.

It should be noted that the automated driving controller 60 may have a plurality of types of the standard plans 84. For example, because the average traveling speed VA is reduced in the case where the traveling route 50 has a traffic jam, the station-to-station duration TT tends to become longer. Further, in the case where a large number of users get on and off the vehicle, the stopping time at the station 54 tends to become longer, and the station-to-station duration TT also tends to become longer. Further, because the average traveling speed VA cannot be increased when a roadbed is frozen, the station-to-station duration TT tends to become longer. Therefore, an appropriate station-to-station duration TT of each vehicle 52 is different depending on traffic conditions, road conditions, transportation demand or the like. The automated driving controller 60 may therefore have a plurality of types of standard plans 84, and select a single standard plan 84 according to a state.

In this case, the automated driving controller 60 may select the standard plan 84 on the basis of at least one of the date and time, road conditions on the traveling route 50, and traffic conditions. Herein, the date and time significantly affect a transportation demand or a traffic conditions. At night time when a transportation demand is low and a traffic jam is unlikely to occur, the standard plan 84 having a short station-to-station duration TT may be selected, and in a commuting time zone when a transportation demand is high and a traffic jam tends to occur, the standard plan 84 having a long duration may be selected. Further, in the case where road surface is frozen, the standard plan 84 having a long station-to-station duration TT may be selected. Furthermore, in the case where there is a traffic jam, the standard plan 84 having a long station-to-station duration TT may be selected.

In any case, the vehicle 52 can be operated more appropriately by generating the interim plan 86 on the basis of the standard plan 84 selected according to conditions.

Further, although the interim plan 86 is generated in the case where the traveling plan 80 has not arrived or is irregular in the examples explained above, the interim plan 86 may be generated at another time. For example, there is a case where a command to discontinue an operation is transmitted from the operation management device 12 to the vehicle 52 for some reason. In such a case, the vehicle 52 stops on the spot after confirming safety. A stopped position of the vehicle 52 is normally a point of receiving the traveling plan 80, that is, a position different from the specific station 54a. Therefore, even if the vehicle 52 receives a command to restart an operation from the operation management device 12 after temporary stopping, the vehicle cannot receive the traveling plan 80 at the stopped position.

As described, in the case where a command to restart an operation is received after receiving the command to discontinue an operation, the automated driving controller 60 generates the interim plan 86 on the basis of the standard plan 84, and allows the vehicle to travel according to the interim plan 86. For example, it is assumed that the vehicle 52A received the command to discontinue an operation at an intermediate position between the station 54a and the station 54b. In this case, the vehicle 52A temporarily stops at the intermediate position. After that, the automated driving controller 60 restarts traveling of the vehicle 52A in the case where it has received the command to restart an operation.

For example, the automated driving controller 60 allows the vehicle to travel while keeping to the speed limit without generating the interim plan 86 from the intermediate position to the station 54b. Then, when the vehicle arrives at the station 54b, the controller generates the interim plan 86 to the station 54a on the basis of the standard plan 84 by using a scheduled departure clock time of the station 54b as a reference. Then, after the interim plan 86 is generated, the automated driving controller 60 allows the vehicle to travel according to the interim plan 86. When the vehicle 52 arrives at the station 54a as a result of the traveling, the automated driving controller 60 transmits a request for the traveling plan 80 to the operation management device 12. Then, when an appropriate traveling plan 80 is transmitted from the operation management device 12, the vehicle 52 is allowed to travel thereafter according to the traveling plan 80.

As described above, even in the case where the command to discontinue an operation and the command to restart an operation are received, the vehicle 52 can be allowed to travel stably by generating the interim plan 86 on the basis of the standard plan 84.

It should be noted that the above-explained constitution is only an example, and other constitutions may be changed appropriately as long as the automated driving controller 60 generates the interim plan 86 on the basis of the standard plan 84 in the case where the traveling plan 80 has not arrived or is irregular, and allows the vehicle to travel autonomously so as to fulfill the interim plan. For example, the modes of the traveling plan 80, the standard plan 84, the interim plan 86 may be changed appropriately. Further, the number of or distance between the vehicles 52 and the stations 54 may be also changed appropriately. Therefore, the plurality of vehicles 52 do not necessarily need to be operated at equal intervals.

REFERENCE SIGNS LIST

10 traffic system, 12 operation management device, 14 plan generating part, 16 communication device, 18 operation monitoring part, 20 storage device, 22,60a processor, 24 input/output device, 26 communication I/F, 50 traveling route, 52 vehicle, 54 station, 56 automated driving unit, 58 drive unit, 60 automated driving controller, 60b memory, 62 environmental sensor, 66 positional sensor, 68 communication device, 80 traveling plan, 82 traveling information, 84 standard plan, 86 interim plan

The invention claimed is:

1. An automated driving vehicle comprising:
a communication device which receives a traveling plan from an operation management device provided outside the vehicle, the traveling plan specifying departure or arrival times for each of a plurality of stations that are located along a traveling route; and
an automated driving controller which allows the vehicle to travel autonomously along the traveling route on which the plurality of stations are set so as to fulfill the traveling plan, wherein
the automated driving controller includes a memory in which is stored a standard plan which prescribes a standard operation schedule of the vehicle for autonomously traveling along the traveling route,
the automated driving controller determines whether the traveling plan has been received from the operation management device by a necessary time, and in a case that the traveling plan has been received from the operation management device by the necessary time, the automated driving controller determines whether the traveling plan is irregular,
the automated driving controller, in a case where the traveling plan has not been received from the operation management device by the necessary time or the traveling plan is determined to be irregular, generates an interim plan based on the standard plan, and allows the vehicle to travel autonomously along the traveling route so as to fulfill the interim plan, and
the standard plan prescribes departure or arrival timing for each of the plurality of stations at a time interval or an elapsed time from a point of departing from a specified one of the plurality of stations without specifying a time of day for departure or arrival at each of the plurality of stations.

2. The automated driving vehicle according to claim 1, wherein
the automated driving controller, when the traveling plan has not been received from the operation management device by the necessary time or is determined to be irregular, in the case where the vehicle is delayed from a normal traveling plan or the interim plan which has been recently acquired, generates a new interim plan to accelerate the vehicle so as to eliminate the delay.

3. The automated driving vehicle according to claim 1, wherein
the automated driving controller has a plurality of types of the standard plan, and generates the interim plan based on one of the plurality of types of the standard plan alternatively selected in the case where the traveling plan has not been received from the operation management device by the necessary time or is determined to be irregular.

4. The automated driving vehicle according to claim 3, wherein
the automated driving controller selects a single one of the plurality of types of the standard plan based on at least one of a current date and time, a road surface state of a traveling route, and a traffic conditions of the traveling route.

5. The automated driving vehicle according to claim 1, wherein
the automated driving controller, in a case where a scheduled speed prescribed in the traveling plan that is received from the operation management device is outside of a prescribed reference speed range, determines that the traveling plan is irregular.

6. The automated driving vehicle according to claim 1, wherein
the automated driving controller, in a case where a command to restart an operation is received from the operation management device after receiving a command to discontinue the operation, generates the interim plan based on the standard plan, and executes restoration traveling in which the vehicle is allowed to travel autonomously for a certain section so as to fulfill the interim plan.

7. The automated driving vehicle according to claim 1, wherein
the automated driving controller, in the case where the traveling plan has not been received within a predetermined allowable time, stops generation of the interim plan and stops the vehicle.

8. A method of controlling an automated driving vehicle, the method comprising:
receiving, by a communication device of the vehicle, a traveling plan from an operation management device provided outside the vehicle, the traveling plan specifying departure or arrival times for each of a plurality of stations that are located along a traveling route, and
allowing, by an automated driving controller of the vehicle, the vehicle to travel autonomously along the traveling route on which the plurality of stations are set so as to fulfill the traveling plan, wherein
the automated driving controller determines whether the traveling plan has been received from the operation management device by a necessary time, and in a case that the traveling plan has been received from the operation management device by the necessary time, the automated driving controller determines whether the traveling plan is irregular,
in a case where the traveling plan has not been received from the operation management device by the necessary time or the traveling plan is determined to be irregular, generating, by the automated driving controller, an interim plan based on a standard plan which is stored in a memory of the automated driving controller and which prescribes a standard operation schedule of the vehicle, and allowing the vehicle to travel autonomously along the traveling route so as to fulfill the interim plan, and the standard plan prescribes departure or arrival timing for each of the plurality of stations at a time interval or an elapsed time from a point of departing from a specified one of the plurality of stations without specifying a time of day for departure or arrival at each of the plurality of stations.

* * * * *